United States Patent [19]

Martin

[11] Patent Number: 5,500,396

[45] Date of Patent: Mar. 19, 1996

[54] PROCESS TO MAKE SMALL, DISCRETE, SPHERICAL ADDUCTS

[75] Inventor: Joel L. Martin, Bartlesville, Okla.

[73] Assignee: Phillips Petroleum Company, Bartlesville, Okla.

[21] Appl. No.: 385,619

[22] Filed: Feb. 9, 1995

[51] Int. Cl.$^6$ ................................................. B01J 35/08
[52] U.S. Cl. ................................ 502/8; 502/9; 502/133; 502/439
[58] Field of Search ........................... 502/8, 9, 133, 502/439

[56] References Cited

U.S. PATENT DOCUMENTS

| | | | |
|---|---|---|---|
| 2,635,041 | 4/1953 | Hansley et al. | 44/51 |
| 2,642,344 | 6/1953 | Livingston | 44/51 |
| 2,642,345 | 6/1953 | Bradley et al. | 44/51 |
| 2,777,887 | 1/1967 | Weinmayr | 260/665 |
| 3,642,746 | 2/1972 | Kashiwa et al. | 260/88.2 |
| 4,042,374 | 8/1977 | Rasmussen et al. | 75/5 B |
| 4,315,874 | 2/1982 | Ushida et al. | 264/5 |
| 4,399,054 | 8/1983 | Ferraris et al. | 252/429 B |
| 4,421,674 | 12/1983 | Invernizzi et al. | 502/154 |
| 4,469,648 | 9/1984 | Ferraris et al. | 264/9 |
| 4,699,960 | 10/1987 | Gordini et al. | 526/81 |
| 5,077,327 | 12/1991 | Cecchin et al. | 524/68 |
| 5,100,849 | 3/1992 | Miya et al. | 502/9 |
| 5,212,246 | 5/1993 | Ogale | 525/240 |

FOREIGN PATENT DOCUMENTS

| | | | |
|---|---|---|---|
| 2026507 | 3/1991 | Canada | C08F 4/64 |
| 0281524 | 9/1988 | European Pat. Off. | C08F 4/64 |
| 0376936 | 7/1990 | European Pat. Off. | C08F 4/638 |

*Primary Examiner*—E. Rollins Cross
*Assistant Examiner*—Timothy H. Meeks
*Attorney, Agent, or Firm*—Carl D. Corvin

[57] ABSTRACT

A process to make a small, discrete, spherical magnesium dihalide\alcohol adduct is provided. This process comprises: contacting a magnesium dihalide and an alcohol in a high-viscosity liquid that consists of hydrocarbons, to obtain a dispersion; heating and agitating the dispersion to obtain a molten dipersion; cooling the molten dispersion to form said small, discrete, spherical magnesium dihalide\alcohol adduct.

14 Claims, No Drawings

5,500,396

PROCESS TO MAKE SMALL, DISCRETE, SPHERICAL ADDUCTS

BACKGROUND OF THE INVENTION

This invention is related to the field of making small, discrete, spherical adducts. In particular, this invention is related to the field of making a small, discrete, spherical adducts of magnesium dihalide\alcohol.

The preparation of olefin polymerization catalysts from magnesium dihalide\alcohol adducts has been known since about 1970. Most often these adducts were prepared by either ball milling a mixture of an alcohol and magnesium dihalide, or by mixing an alcohol and magnesium dihalide in a solvent that would not complex with the magnesium dihalide. However, both of these approaches suffered from the problems of poor particle size control and poor particle size shape.

Various solutions to these problems have been proposed. One approach was to use a spray drier to dry either a suspension or a solution of the adduct, thereby obtaining said adduct. This approach had several problems. One problem was removing large volumes of flammable hydrocarbons from the process. Removing these flammable hydrocarbons required special safety equipment and this equipment greatly added to the cost of producing said adduct.

Another approach has been to form the adduct in a low-viscosity, liquid medium that has a temperature greater than the melting point of the adduct. However, this approach also has several problems. One problem is that particle size distribution control and particle size control was not at the desired level.

SUMMARY OF THE INVENTION

It is an object of this invention to provide a process to make a small, discrete, spherical adduct of magnesium dihalide\alcohol.

It is another object of this invention to provide a process to make a small, discrete, spherical adduct of magnesium dichloride\ethanol.

In accordance with this invention, a process to make a small, discrete, spherical magnesium dihalide\alcohol adduct is provided. This process comprises: contacting a magnesium dihalide and an alcohol in a high-viscosity liquid that consists of hydrocarbons, to obtain a dispersion; heating and agitating the dispersion to obtain a molten dispersion; cooling the molten dispersion to form said small, discrete, spherical magnesium dihalide\alcohol adduct.

DETAILED DESCRIPTION OF THE INVENTION

In general, this invention is a process to make a small, discrete, spherical adduct of magnesium dihalide\alcohol by cooling a dispersion of the molten adduct in a high-viscosity, hydrocarbon oil.

The magnesium dihalide can be obtained from several commercial sources. It is important that the magnesium dihalide be substantially water free. That is, the water content should be less than five weight percent based on the total weight of the magnesium dihalide and water. Presently, magnesium dichloride is preferred because of its availability and ease of use. Additionally, magnesium dihalide tends to produce the best adducts for making titanium-based, polymerization catalysts.

The alcohol can be obtained from several commercial sources. The alcohol can have from 1 to about 20 carbon atoms per molecule structure. However, branched chain alcohols are more difficult to work with because they tend not to produce the desired melt composition. Straight chain alcohols do tend to produce the desired melt composition. It is preferred that the alcohol is a straight chain compound that has from 1 to about 6 carbon atoms per molecule. This is because increasing the chain length promotes the undesired dissolution of the adduct into the high-viscosity, hydrocarbon oil. The most preferred alcohol is ethanol due to ease of adduct formation and low solubility of the magnesium dihalide\ethanol adduct in the high-viscosity hydrocarbon oil.

The molar ratio of magnesium dihalide to alcohol is from about one to about ten. However, it is more preferred if the molar ratio of magnesium dihalide to alcohol is from about two to about four. When the molar ratio get substantially above four the adduct tends to be difficult to dry, and the dried adduct tends to be very sticky.

The high-viscosity, hydrocarbon oil should have a viscosity high enough that small, discrete, spherical particles are formed, but not so high that effective agitation is not possible. In general, the viscosity of the hydrocarbon oil should be above 50 cSt at 40° C. (as measured in accordance with ASTM D445). It is more preferred if the viscosity is greater than about 60 cSt. It is even more preferred if the viscosity is greater than about 100 cSt. This is because using a higher viscosity tends to produce a smaller, more spherical, adduct. However, it is preferred if the viscosity of the hydrocarbon liquid is less than 1400 cSt at 40° C. It is more preferred if the viscosity is lower than about 1200 cSt and it is even more preferred that the viscosity is lower than about 1000 cSt. This is because using too high a viscosity can adversely affect the formation of the adduct, such as, for example producing an adduct with a nonspherical shape.

The adduct can be formed by contacting a magnesium dihalide and an alcohol, in the presence of a high-viscosity hydrocarbon oil, until a dispersion of a solid in the oil is obtained. This dispersion is then heated and agitated until the solid has melted. The agitation should be sufficient to disperse the adduct substantially homogeneously through the medium. For a magnesium dichloride\ethanol adduct the melting temperature is about 110° C. to about 160° C. Higher temperatures are preferred so that the magnesium dihalide\ethanol adduct is completely melted. Melting of the adduct in the oil produces a molten dispersion. This molten dispersion is then cooled, while agitation continues to below the melting point of the adduct to form small, discrete, spherical particles. The adduct is then obtained by removing excess liquid. A washing step can be included at this point. The spherical adduct can be washed with a washing solution that does not dissolve the adduct. Suitable washing solutions are alkanes, alkenes, xylenes, aromatic and chlorinated hydrocarbons, and mixtures thereof.

EXAMPLES

These examples are provided to further assist a person skilled in the art with understanding the invention. These examples are intended to be illustrative of the invention and are not meant to be construed as limiting the scope of the invention.

EXAMPLE ONE

Preparation of Small, Discrete, Spherical $MgCl_2$\Ethanol Adducts in Various Hydrocarbon Liquids of Differing Viscosity.

These runs utilized a 250 mL, 3-neck glass round bottom flask fitted with a heating mantle, a $N_2$ inlet, an air-driven stirrer with a 2¼ inch TEFLON blade, and a rubber septum through which ethanol could be added by syringe and needle.

A typical run was conducted as follows. The flask was charged with 2.72 g (28 mmoles) of milled anhydrous $MgCl_2$ and 120 mL of the indicated hydrocarbon. This mixture was then stirred until the $MgCl_2$ was dispersed. Anhydrous ethanol (6.7 mL, 115 mmoles) was then charged to the mixture. The mixture was then subjected to heating while the stirring continued. Heating was continued until two clear liquid phases were evident. Stirring speed was then increased to 600–700 rpm for 5 minutes. The heating mantle was then replaced with an ice/water bath and the temperature was lowered to about 30° C. Stirring was continued, at a reduced speed, after reaching 30° C. for approximately 30 minutes. The particulate solid obtained was washed several times with dry heptane to remove the original hydrocarbon liquid. The particulate solid was then recovered by filtration and subsequently dried in a glove box. The recovered solid was then examined by visual inspection including, in some instances, the use of a microscope to more closely observe the spherical nature of the particles. Results from these runs are summarized in Table I.

TABLE ONE

HYDROCARBON LIQUIDS[2]

| RUN[1] | Name | Viscosity, cSt @ 40° C.[3] | PARTICLE APPEARANCE |
|---|---|---|---|
| 1 | SUNPAR 2280 | 481 | about ½ were well formed spheres |
| 2 | ETHYLFLO 180 | 1400 | free flowing solid, no spheres |
| 3 | KAYDOL | 68 | clusters of well formed spheres |
| 4 | BLANDOL | 15 | large undesirable particles, about 1 mm diameter, some spheres, but many irregular shapes |
| 5 | n-Decane | 1 | solidified mass in bottom of flask, no spheres |

[1]Anhydrous magnesium chloride was employed in this example and in the following examples. It was ball-milled in the following manner prior to use. A 250 mL steel vessel containing 400 grams of ⅜ inch diameter steel balls was charged with 25 grams anhydrous $MgCl_2$ and the mixture milled for 5–6 hours at room temperature under nitrogen using a Siebtek vibrating mill. The milled anhydrous $MgCl_2$ was then stored under nitrogen until it was used.
[2]The various hydrocarbon liquids used in this example, and in the following examples, were used as received from the suppliers, i.e. no pretreatment of the hydrocarbon liquids was carried out.
[3]ASTM D 445. The values shown are typical values except for n-decane which is estimated.

The results shown in Table One demonstrate that if the viscosity of the continuous hydrocarbon liquid phase is too low, as in runs 4 and 5, suitable small, discrete, spherical particles did not result. It also shows that if the viscosity is too high, as in run 2, suitable small, dicrete, spherical particles did not result.

Table Two shows the names and sources of some commercially available liquid, paraffinic, hydrocarbon oils that were used in the runs of this example as well as in the following examples.

TABLE TWO

| Name | Viscosity, cSt @ 40° C.[1] |
|---|---|
| TUFFLO 30 | 67 |
| TUFFLO 50 | 111 |

TABLE TWO-continued

| Name | Viscosity, cSt @ 40° C.[1] |
|---|---|
| TUFFLO 80 | 550 |
| ETHYLFLO 170 | 63 |
| ETHYLFLO 180 | 1400 |
| SUNPAR 2280 | 481 |
| KAYDOL | 68 |
| BLANDOL | 15 |

[1]Viscosity values shown were obtained from information provided by the supplier indicated.

EXAMPLE TWO

Preparation of Small, Discrete, Spherical $MgCl_2$\Ethanol Adducts in Various Hydrocarbon Liquids of Differing Viscosity.

These runs were conducted in a 2 liter, 3-neck glass round bottom flask. The flask was equipped in the same manner as the smaller flask used in Example One. The maximum rpm for the air driven stirrer was about 800. The stirring blade was a 3⅛ inch TEFLON blade. In some runs, where cooling of the mixture was closely followed, a digital thermometer was inserted through a rubber septum on one neck of the flask.

In these runs 840 mL of hydrocarbon oil was used. The molar ratio of anhydrous ethanol to milled anhydrous $MgCl_2$ was 3:1. However, the concentration of $MgCl_2$ was varied and different hydrocarbons oil were utilized as shown in Table Three. In addition, the effect of the rate of cooling on the particle formation was noted.

In the runs of this example, the cooled particulate slurry at the end of the formation step was diluted with dry heptane, allowed to settle, and the liquid phase removed by decantation or vacuum filtration. The solid complex was then washed with dry heptane several times, filtered, and dried as in Example One.

TABLE THREE

| Run | Hydrocarbon Oil | $MgCl_2$ g/L | Yield, g | Appearance |
|---|---|---|---|---|
| 6[1] | SUNPAR 2280 | 22.6 | 41.38 | close to spherical |
| 7[1] | " | " | 42.2 | well-formed spheres |
| 8[2] | " | " | 21.5 | non-spherical |
| 9[2] | " | " | 21.3 | non-spherical |
| 10[1] | " | 90.7 | 151.0 | very large, undesirable particles, few small spheres |
| 11[1] | " | 45.3 | 85.0 | most small particles were spherical while large particles were non-spherical |
| 12[1] | ETHYLFLO 170 | 45.3 | — | similar to Run 11 |
| 13[1] | ETHYLFLO 180 | 90.7 | 122.8 | close to spherical, but bumpy and large, yet smaller than Run 10 |
| 14[3] | ETHYLFLO 180 | 22.7 | 13.15 | crystals were formed |
| 15[1] | ETHYLFLO 180 | 22.6 | 35.4 | clusters of small spheres |
| 16[1] | SUNPAR 2280 | 22.6 | 35.7 | many spherical particles |

TABLE THREE-continued

| Run | Hydrocarbon Oil | MgCl$_2$ g/L | Yield, g | Appearance |
| --- | --- | --- | --- | --- |

[1]Ethanol was added to the stirred MgCl$_2$ slurry and stirring continued for about 10 minutes longer. The mixture was then heated to about 150° C. and stirred for an hour at this temperature. Stirring rate was then increased to 800 rpm for a short period (about 5 minutes). The heating mantle was removed and replaced with an ice water bath. After 5–10 minutes (temperature down to about 30° C.) the stirrer speed was reduced to about 200 rpm and cooling continued to about 10° C. (about 25 minutes). About 600 mL heptane was then added and the complex recovered as described above.

[2]A slower rate of cooling was employed by using a water bath instead of ice water in Run 8 but this was still more rapid cooling than desired so the mixture was reheated to 120°–130° C. and held there for one hour then cooled again with only ambient air as the cooling medium. However, after 30 minutes the temperature had dropped only to 62° C. so water and then ice water were again employed to cool the mixture to 27° C. Heptane dilution was then employed and the mixture allowed to settle and cool further (20 minutes). Run 9 employed a similar procedure except that "air cooling" was used initially (30 minutes) followed by water (13 minutes) then ice water (8 minutes) before heptane dilution and recovery of the complex.

[3]In this run, the initially formed complex of MgCl$_2$.3(C$_2$H$_5$OH) evidently failed to completely melt presumably because of insufficient heat applied to the mixture as evidenced by the fact that the white (opaque) MgCl$_2$ phase did not become "clear" in appearance prior to the stirring and subsequent steps.

The results shown in Table Three show several factors in achieving success in the formation of small, discrete, spherical particles of the MgCl$_2$.3(C$_2$H$_5$OH) complex.

First, the initially formed complex of MgCl$_2$ and ethanol should be melted for proper dispersion in the hydrocarbon medium (Run 14).

Second, slow cooling (runs 8 and 9) was not as effective as more rapid cooling (runs 6 and 7) in producing the complex.

Third, higher viscosity was beneficial in giving a "cleaner" reaction mixture, i.e. less solids stuck to vessel walls. The higher viscosity hydrocarbon may also be able to tolerate a higher concentration of MgCl$_2$.3(C$_2$H$_5$OH) when forming small, discrete, spherical particles of the complex by this method (run 10 compared to run 13).

Finally, a lower concentration of MgCl$_2$.3(C$_2$H$_5$OH) is helpful in forming the small, discrete, spherical particles of the complex according to this method (runs 6, 10 and 11 compared to runs 13 and 15).

EXAMPLE THREE

Preparation of Small, Discrete, Spherical MgCl$_2$\Ethanol Adducts in Various Hydrocarbon Liquids of Differing Viscosity.

These runs were conducted in a 1-gallon Autoclave Engineers steel reactor. This reactor was equipped with a heating/cooling (steam/water) jacket, a nitrogen inlet, a solids addition port, and an air-driven stirrer.

Three different stirrer configurations were tested for in this reactor:

Configuration "A" was a "3 blade" arrangement which used a 3 inch long, ½ inch wide, flat blade situated in between (1 inch apart) 3 inch diameter, 3 blade Lightnin' ½ inch wide blades Configuration "B" was a marine type propeller, which was 4¾ inches in diameter, and had 3 blades, which were 2 inches wide, set at an acute angular pitch; and Configuration "C" utilized a paddle which was a 4¾ inches wide, 3 inches high, flat blade contoured to the autoclave at the bottom, and having less than ½ inch clearance from the inside walls.

In each configuration, the lowest part of the stirrer was kept about ½ inch from the bottom of the reactor.

In each run, the reactor was charged with 1700 mL of hydrocarbon liquid and heated to over 100° C. The vapor space was flushed with 450 psig nitrogen three times using a block and bleed procedure. The reactor was then cooled to 30° C. After adding the magnesium chloride through a charge port in the head of the autoclave, the mixture was stirred at 650 rpm under 10 psig of nitrogen for 10 minutes to disperse the magnesium chloride. Absolute ethanol was then added, and stirring at 650 rpm under 10 psig of nitrogen was continued for 15 minutes. The addition of ethanol caused about a 5 degree rise in temperature. The temperature was then raised to 125° C. and the stirring speed was held at 650 rpm for 30 minutes. The stirring speed was then raised to what was usually the maximum speed which could be attained at the air pressure setting. This speed was dependent on the type of stirrer and the viscosity of the oil. After 15 minutes at maximum speed, the heating was stopped, and cooling water was circulated through the jacket to cool the autoclave. The temperature was recorded as it decreased, and once 30° C. was reached the stirring speed was reduced to 200 rpm. After 30 minutes, about 1000 grams of heptane was added and mixed in at 650 rpm for 10 minutes. The mixture was then allowed to settle for at least 30 minutes. After drawing off about 2300 mL of liquid through a tube, about 600 mL of heptane was added and stirred in. Liquid was drawn off again and the solid washed with heptane once more. Finally, the whole mixture was drawn off into a flask fitted with Teflon valves, which could be closed, for introduction into a glove box through a vacuum port. The solid was filtered off, washed with heptane, and dried in the glove box under nitrogen atmosphere. Solids were evaluated by examination using an optical microscope and in some cases with a Microtrac particle size analyzer.

Particle size distributions were determined as heptane slurries in a Microtrac Model 9200 FRA particle size analyzer. The light scattering technique employed yields volume weighted mean diameter and distribution curves.

Results from these runs are shown in Table Four. Particle size distribution results for many of the runs are shown in Table Five.

TABLE FOUR

| Run | Hydrocarbon | MgCl$_2$[1] | EtOH[1] | Stirrer | RPM | Temp °C. | Cooling[2] | Yield | Dm[3] | Comments[4] |
| --- | --- | --- | --- | --- | --- | --- | --- | --- | --- | --- |
| 42 | Sun 2280 | 38 | 70 | 3 Blades | 1400 | 125 | 7.0 | 60.1 | 88 | near spherical |
| 43 | Sun 2280 | 38 | 70 | Prop | 1300 | 125 | 6.5 | 30 | 93 | near spherical |
| 44 | Sun 2280 | 38 | 70 | Paddle | 965 | 125 | 5.6 | 44.7 | 43 | good spheres, small |
| 45 | Tufflo 50 | 38 | 70 | 3 Blades | 1385 | 125 | 4.6 |  | 324 | very large, joined |
| 46 | Tufflo 50 | 152 | 280 | 3 Blades | 1200 | 125 | 6.5 | 127.1 | 539 | extremely large |
| 47 | Tufflo 50 | 38 | 70 | 3 Blades | 2000 | 125 | 4.5 | 57.7 | 252 | large, near spherical |
| 48 | Tufflo 30 | 38 | 70 | 3 Blades | 1375 | 125 | 4.6 | 53.2 | 345 | very large, near spherical |

TABLE FOUR-continued

| Run | Hydrocarbon | MgCl$_2$[1] | EtOH[1] | Stirrer | RPM | Temp °C. | Cooling[2] | Yield | Dm[3] | Comments[4] |
|---|---|---|---|---|---|---|---|---|---|---|
| 49 | Sun 2280 | 38 | 70 | 3 Blades | 2000 | 125 | 6.2 | 15 | 31 | small, near spherical |
| 50 | Sun 2280 | 152 | 280 | 3 Blades | 2000 | 125 | 7.1 | 272.5 | 163 | large, mostly joined |
| 51 | Tufflo 50 | 38 | 70 | Paddle | 1400 | 125 | 3.9 | 59 | 229 | large, some joined |
| 52 | Tufflo 30 | 38 | 70 | Paddle | 1400 | 125 | 3.3 | 54 | 340 | very large, elongated |
| 53 | Ethyl 180 | 38 | 70 | Paddle | 1275 | 125 | 6.3 |  | 18 | irregular, agglomerates |
| 54 | Ethyl 180 | 152 | 280 | Paddle | 1400 | 125 | 9.1 | 67.4 | 42 | irregular agglomerates |
| 55 | Ethyl 180 | 38 | 70 | Paddle | 900 | 125 | 6.9 | 31 | 26 | severe agglomeration |
| 56 | Ethyl 180 | 38 | 70 | 3 Blades | 1400 | 125 | 7.5 | 40 | 25 | irregular agglomerates |
| 57 | Sun 2280 | 76 | 140 | Paddle | 965 | 125 | 7.5 | 87 | 60 | medium spheres |
| 58 | Sun/Tuff 80 | 38 | 70 | Paddle | 1400 | 125 | 5.6 | 52 | 24 | very small, near spherical |
| 61 | Sun 2280 | 38 | 70 | Paddle | 1100 | 125 | 5.0 | 18.5 | 24 | small, near spherical |
| 62 | Sun 2280 | 38 | 70 | Paddle | 1100 | 125 | 5.2 | 81.5 | 30 | small, near spherical |
| 63 | Sun 2280 | 38 | 70 | Paddle | 1100 | 140 | 5.5 | 76 | 72 | small, many agglomerates |
| 64 | Sun 2280 | 38 | 70 | Paddle | 1100 | 140 | 5.4 | 102.7 | 64 | mostly agglomerates |
| 65 | Sun 2280 | 38 | 70 | Paddle | 1100 | 140 | 8.5 | 28 | 56 | small, (prematurely cooled) |
| 66 | Sun 2280 | 38 | 70 | Paddle | 1100 | 140 | 5.2 | 55 | 57 | small, mostly agglomerates |
| 67 | Sun 2280 | 38 | 70 | Paddle | 1100 | 140 | 2.2 | 16.3 |  | solid mass, wet MgCl$_2$ |
| 69 | Sun 2280 | 38 | 70 | Paddle | 1100 | 140 | 4.5 | 49.1 | 52 | small |
| 70 | Sun 2280 | 38 | 70 | Paddle | 1100 | 140 | 5.1 | 74.1 | 47 | small |
| 71 | Sun 2280 | 38 | 70 | Paddle | 1100 | 140 | 4.1 | 47 | 78 | small to medium, spherical |
| 72 | Sun 2280 | 38 | 70 | Paddle | 1100 | 140 | 5.0 | 40 | 46 | small, spherical |
| 73 | Sun 2280 | 38 | 70 | Paddle | 1100 | 140 | 5.2 | 69 | 54 | small, spherical |
| 75 | Sun 2280 | 38 | 70 | Paddle | 1100 | 140 | 5.3 | 85 | 33 | small, spherical |
| 76 | Sun 2280 | 38 | 70 | Paddle | 1100 | 150 | 4.5 | 87.7 | 37 | small, spherical |
| 77 | Sun 2280 | 38 | 70 | Paddle | 1100 | 150 | 4.7 | 72.5 | 77 | medium, spherical |
| 78 | Sun 2280 | 38 | 70 | Paddle | 1100 | 150 |  | 63.2 | 46 | small, spherical |
| 79 | Sun 2280 | 38 | 70 | Paddle | 1100 | 150 |  | 82.9 | 38 | small, spherical |
| 80 | Sun 2280 | 38 | 70 | Paddle | 1100 | 150 |  | 72.2 |  | small, agglomerates |
| 81 | Sun 2280 | 38 | 70 | Paddle | 1100 | 150 |  | 79.6 |  | small, spherical |
| 82 | Sun 2280 | 38 | 70 | Paddle | 1100 | 150 |  | 84 |  | small, spherical |
| 83 | Sun 2280 | 38 | 70 | Paddle | 1100 | 150 |  | 88 |  | small, spherical |
| 84 | Sun 2280 | 38 | 70 | Paddle | 1100 | 150 |  | 83 |  | small, some irregular |
| 85 | Sun 2280 | 38 | 70 | Paddle | 1100 | 150 |  | 79 |  | small, spherical |
| 86 | Sun 2280 | 38 | 70 | Paddle | 1100 | 150 |  | 79 |  | small, spherical |
| 87 | Sun 2290 | 38 | 70 | Paddle | 1100 | 150 |  | 49 |  | small, spherical |
| 88 | Sun 2280 | 38 | 70 | Paddle | 1100 | 150 |  | 72 |  | small, spherical |
| 89 | Sun 2280 | 38 | 70 | Paddle | 1100 | 150 |  | 77.4 |  | agglomerates |
| 90 | Sun 2280 | 38 | 70 | Paddle | 1100 | 150 |  |  |  | many clumps |
| 91 | Sun 2280 | 38 | 70 | Paddle | 1100 | 150 |  |  |  | spherical |

[1] Units of measure are grams for solids and mL for liquids.
[2] Time in minutes to cool to 40° C.
[3] Volume median diameter in microns.

As can be seen from table four, all of the stirrers could give suitable product, but the paddle design gave the most consistent results and desirable size.

Because of the inherent properties of the oils, all of the experimental conditions could not be closely controlled. In particular, the heat transfer properties of the oil depend on the viscosity of the oil and heavier oils were more difficult to cool. This trend is apparent by comparison of runs 42, 45, 48, and 52 with run 51, and run 44 with run 55. The time to reach 40° C. ranged from 3.3 to 7 minutes depending on the oil and stirrer in use. Despite the longer cooling time, the size of the particles actually decreased as the viscosity of the oil increased. This trend is particularly evident in runs 52 and 44 where the cooling time to 40° C. increased from 3.3 to 6.5 minutes due to changes in the oil and the stirring rate, and yet because of the higher viscosity of the oil the median diameter of the particles decreased from 340 to 43 microns. Even though run 44 was made with a slower stirring rate, the smallest, and most well formed particles were obtained in this case.

Comparing run 45 with run 47 and run 44 with 61 shows that, with the same stirrer and oil in each case, increasing the stirring speed had only a minor affect on the cooling time. Nevertheless, smaller particles could be made at higher stirring speeds indicating that the initial dispersion of the molten complex in the oil is important in determining size.

The amount of MgCl$_2$ and ethanol used also influenced the quality of the product with larger particles and more joining of spheres occurring with larger amounts, as seen by comparing run 44 with run 57 (43 to 60 microns), run 45 with run 46 (324 to 539 microns) and run 49 with run 50 (31 to 163 microns). The size of the particles does not tell the whole story because many particles appeared as joined spheres at the higher concentrations. It is desirable to work with as dilute a mixture as is practical to obtain a shape close to spherical. Good results were obtained with 38 g in 1.7 L of oil, or about 22 g/L; the end use requirements and final production equipment will determine how high the concentration can be.

The type of stirrer also influenced the particle size, with more efficient mixing helping to reduce the particle size. This point cannot be stated conclusively because the shape of the stirrer influences the amount of power imparted to the slurry. In this case, the power supplied to the stirrer was controlled by the air flow and was, therefore, roughly constant while changes in the stirrer resulted in changes in the stirring speed. Nevertheless, out of runs 42, 43 and 44, the paddle produced both the lowest stirring speed and the smallest particles, when other factors were held constant.

The temperature of the reactor during the high hold step was also important. When operating in glassware, the mixture was murky until at least 125° C. was reached and even better clarity was seen at higher temperatures of 140° C. or more. Therefore, slightly better consistency can be obtained when using higher temperatures.

The quality of the $MgCl_2$ was not thoroughly explored, but an attempt to use some material which was stored with poor provisions to exclude the atmosphere resulted in a poorly shaped, opaque product (runs 69 and 90). Therefore, efforts should be made to keep the $MgCl_2$ as dry as possible.

TABLE FIVE

PARTICLE SIZE DISTRIBUTION OF $MgCl_2(EtOH)_3$

| Run | d(10%)[1] | d(50%) | d(90%) | Stand. Dev.[2] | d(90)/d(10) | Mean[3] |
|-----|-----------|--------|--------|----------------|-------------|---------|
| 42 | 37.7 | 88.0 | 161.3 | 1.43 | 4.3 | 96.9 |
| 43 | 42.3 | 92.8 | 143.1 | 1.20 | 3.4 | 93.6 |
| 44 | 23.0 | 43.3 | 73.7 | 1.33 | 3.2 | 46.4 |
| 45 | 235.3 | 323.8 | 396.3 | 0.96 | 1.7 | 318.6 |
| 46 | 10.7 | 539.4 | 670.5 | 0.97 | 62.5 | 356.3 |
| 47 | 145.8 | 252.5 | 339.0 | 1.05 | 2.3 | 246.0 |
| 48 | 220.8 | 345.3 | 427.8 | 0.97 | 1.9 | 334.3 |
| 49 | 13.4 | 31.1 | 71.8 | 1.80 | 5.4 | 38.6 |
| 50 | 79.7 | 163.0 | 285.8 | 1.37 | 3.6 | 173.8 |
| 51 | 146.2 | 228.8 | 337.4 | 1.15 | 2.3 | 235.9 |
| 52 | 58.7 | 339.6 | 416.9 | 0.96 | 7.1 | 291.9 |
| 53 | 3.8 | 18.5 | 202.0 | 8.55 | 52.9 | 62.6 |
| 54 | 8.1 | 42.5 | 117.3 | 2.16 | 14.5 | 55.8 |
| 55 | 5.0 | 26.0 | 78.1 | 2.35 | 15.6 | 41.5 |
| 56 | 4.9 | 25.3 | 64.4 | 1.99 | 13.1 | 31.6 |
| 57 | 33.4 | 60.5 | 98.1 | 1.27 | 2.9 | 64.2 |
| 58 | 7.2 | 24.0 | 44.4 | 1.44 | 6.1 | 26.0 |
| 61 | 17.0 | 38.9 | 67.5 | 1.36 | 4.0 | 41.1 |
| 62 | 12.7 | 29.7 | 52.1 | 1.37 | 4.1 | 31.4 |
| 63 | 31.9 | 71.9 | 153.4 | 1.67 | 4.8 | 86.2 |
| 64 | 29.6 | 63.7 | 109.0 | 1.34 | 3.7 | 67.3 |
| 65 | 18.9 | 56.2 | 110.7 | 1.54 | 5.9 | 63.3 |
| 66 | 26.3 | 56.8 | 108.3 | 1.49 | 4.1 | 65.3 |
| 69 | 22.7 | 51.9 | 192.9 | 2.91 | 8.5 | 85.2 |
| 70 | 19.6 | 47.3 | 84.7 | 1.40 | 4.3 | 50.6 |
| 71 | 33.3 | 78.5 | 157.2 | 1.56 | 4.7 | 90.8 |
| 72 | 20.5 | 45.6 | 80.5 | 1.38 | 3.9 | 48.8 |
| 73 | 24.9 | 54.3 | 93.0 | 1.34 | 3.7 | 57.7 |
| 75 | 17.2 | 33.2 | 59.9 | 1.41 | 3.5 | 36.4 |
| 76 | 20.5 | 36.9 | 66.0 | 1.40 | 3.2 | 41.7 |
| 77 | 31.8 | 77.3 | 136.8 | 1.38 | 4.3 | 83.7 |
| 78 | 22.6 | 45.6 | 78.5 | 1.35 | 3.5 | 48.7 |
| 79 | 16.8 | 38.0 | 69.8 | 1.44 | 4.2 | 41.4 |

[1]This is the diameter below which the given percentage of the distribution falls.
[2]This is the geometric standard deviation. The smaller the standard deviation is, the narrower the particle size distribution is.
[3]This is the volume mean of the log normal particle size distribution.

Thus, the results shown in Tables four and five demonstrate that the method of this invention can produce small spherical solid particles of the $MgCl_2.(C_2H_5OH)3$ complex having a narrow particle size distribution. These particles so produced are therefore well suited as catalyst components for the preparation of titanium-based olefin polymerization catalysts, especially ethylene polymerization catalysts.

Although the present has been described in detail with reference to certain preferred versions thereof, other versions are possible. Therefore, the spirit and scope of the appended claims should not be limited to the description of the preferred version contained herein.

That which is claimed is:

1. A process to make a small, discrete, spherical magnesium dihalide/alcohol adduct said process comprising:
   (a) contacting a magnesium dihalide and an alcohol in a high-viscosity liquid that consists of hydrocarbons and that has a viscosity above 50 cSt at 40° C., to obtain a dispersion;
   (b) heating and agitating the dispersion to obtain a molten dispersion;
   (c) cooling the molten dispersion to form said small, discrete, spherical magnesium dihalide/alcohol adduct.

2. A process according to claim 1 wherein said magnesium dihalide is magnesium dichloride.

3. A process according to claim 1 wherein said alcohol is a straight chained alcohol.

4. A process according to claim 1 wherein said alcohol is ethanol.

5. A process according to claim 1 wherein said high-viscosity liquid that consists of hydrocarbons has a viscosity above 50 to about 1200 cSt at 40° C.

6. A process according to claim 1 wherein said high-viscosity liquid that consists of hydrocarbons has a viscosity from about 60 to about 1000 cSt at 40° C.

7. A process according to claim 1 wherein said high-viscosity liquid that consists of hydrocarbons has a viscosity from about 100 to about 1000 cSt at 40° C.

8. A process to make a small, discrete, spherical magnesium dichloride/ethanol adduct said process comprising:
   (a) contacting a magnesium dichloride and ethanol in a high-viscosity liquid that consists of hydrocarbons and that has a viscosity above 50 cSt at 40° C., to obtain a dispersion;
   (b) heating and agitating the dispersion to obtain a molten dispersion;
   (c) cooling the molten dispersion to form said small, discrete, spherical magnesium dichloride/ethanol adduct.

9. A process according to claim 8 wherein said high-viscosity liquid that consists of hydrocarbons has a viscosity above 50 to about 1200 cSt at 40° C.

10. A process according to claim 8 wherein said high-viscosity liquid that consists of hydrocarbons has a viscosity from about 60 to about 1000 cSt at 40° C.

11. A process according to claim 8 wherein said high-viscosity liquid that consists of hydrocarbons has a viscosity from 100 to about 1000 cSt at 40° C.

12. A process to make a small, discrete, spherical magnesium dichloride/ethanol adduct said process consisting essentially of:

(a) contacting a magnesium dichloride and ethanol in a high-viscosity liquid that consists of hydrocarbons and that has a viscosity above 50 to about 1200 cSt at 40° C., to obtain a dispersion;

(b) heating and agitating the dispersion to obtain a molten dispersion;

(c) cooling the molten dispersion to form said small, discrete, spherical magnesium dichloride/ethanol adduct.

13. A process according to claim 12 wherein said high-vicosity liquid that consists of hydrocarbons has a viscosity from about 60 to about 1000 cSt at 40° C.

14. A process according to claim 12 wherein said high-viscosity liquid that consists of hydrocarbons has a viscosity from 100 to about 1000 cSt at 40° C.

* * * * *